(12) United States Patent
Huang (10) Patent No.: US 11,472,010 B2
(45) Date of Patent: Oct. 18, 2022

(54) JOINT DISMOUNTING TOOL

(71) Applicant: SHIFUKANG INDUSTRIAL. CO., LTD., Taichung (TW)

(72) Inventor: Shang-Yuan Huang, Taichung (TW)

(73) Assignee: SHIFUKANG INDUSTRIAL CO., LTD., Taichung (TW)

( * ) Notice: Subject to any disclaimer, the term of this patent is extended or adjusted under 35 U.S.C. 154(b) by 112 days.

(21) Appl. No.: 17/003,546

(22) Filed: Aug. 26, 2020

(65) Prior Publication Data
US 2021/0129303 A1    May 6, 2021

(30) Foreign Application Priority Data

Nov. 5, 2019    (TW) .................................. 108140155

(51) Int. Cl.
*B25B 27/02* (2006.01)
*B25B 27/00* (2006.01)
*B23P 19/02* (2006.01)

(52) U.S. Cl.
CPC ........ *B25B 27/023* (2013.01); *B25B 27/0035* (2013.01); *B23P 19/025* (2013.01)

(58) Field of Classification Search
USPC .............. 29/259, 242, 251, 260, 426.5, 280; 269/251; 220/288
See application file for complete search history.

(56) References Cited

U.S. PATENT DOCUMENTS

| | | | | |
|---|---|---|---|---|
| 1,069,539 | A | * | 8/1913 | Evans, Jr. ........... B25B 27/0028 29/235 |
| 4,534,101 | A | * | 8/1985 | Rosan, Jr. ............... F16B 39/10 29/258 |
| 4,570,319 | A | * | 2/1986 | Skoworodko ........... F16D 3/405 29/259 |
| 9,737,981 | B2 | * | 8/2017 | Rowe .................... B25B 27/062 |

* cited by examiner

*Primary Examiner* — Tyrone V Hall, Jr.
(74) *Attorney, Agent, or Firm* — Muncy, Geissler, Olds & Lowe, P.C.

(57) ABSTRACT

A joint dismounting tool is provided, including a frame body and a pulling assembly. The frame body includes a base portion and two arm portions, and the two arm portions are disposed on the base portion. The pulling assembly includes a driving rod and a cup member, the driving rod is movably disposed on the base portion, the cup member is connected to the driving rod and swingable relative to the axis, and the cup member is between the two arm portions.

12 Claims, 9 Drawing Sheets

JOINT DISMOUNTING TOOL

BACKGROUND OF THE INVENTION

Field of the Invention

The present invention relates to a dismounting tool, and more particularly to a joint dismounting tool.

Description of the Prior Art

In a mechanism, a force is often transmitted via a transmission shaft, for example, a vehicle transmission system uses a transmission shaft and a gear box to transmit power of an engine, the transmission shaft is used with a universal joint, and the universal joint serves as a joint to transmit forces in various angles.

It can be predicted that after being used for a long period of time, a bearing within the universal joint may be gradually abraded or damaged, so a user needs to lubricate the bearing again or replace some parts of the bearing. Traditionally, when replacing the parts, the user has to knock the bearing down manually. Doing so not only wastes the user's energy but also damages structures around the bearing. In addition, if the user knocks the bearing in an inappropriate angle, there may be unexpected collision which causes an interior structure to deform.

The present invention has arisen to mitigate and/or obviate the afore-described disadvantages.

SUMMARY OF THE INVENTION

The major object of the present invention is to provide a joint dismounting tool which can help to lessen the physical burden of a user and ensure the user to dismount a bearing quickly and smoothly.

To achieve the above and other objects, a joint dismounting tool is provided, including a frame body and a pulling assembly. The frame body includes a base portion and two arm portions, the base portion has an assembly hole along an axis thereof, and the two arm portions are spacingly connected to the base portion and respectively extend axially. The pulling assembly includes a driving rod and a cup member, the driving rod is movably disposed through the assembly hole, the cup member is disposed between the two arm portions, the cup member is connected to the driving rod and swingable relative to the axis, the cup member includes a cup top, a cup body and a cup bottom, the cup top is connected to the driving rod, the cup top and the cup bottom are connected to the cup body on two opposite sides, the cup bottom has a recess, the cup top, the cup body and the cup bottom define an interior space which is communicable with outside, and the interior space communicates with the recess.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
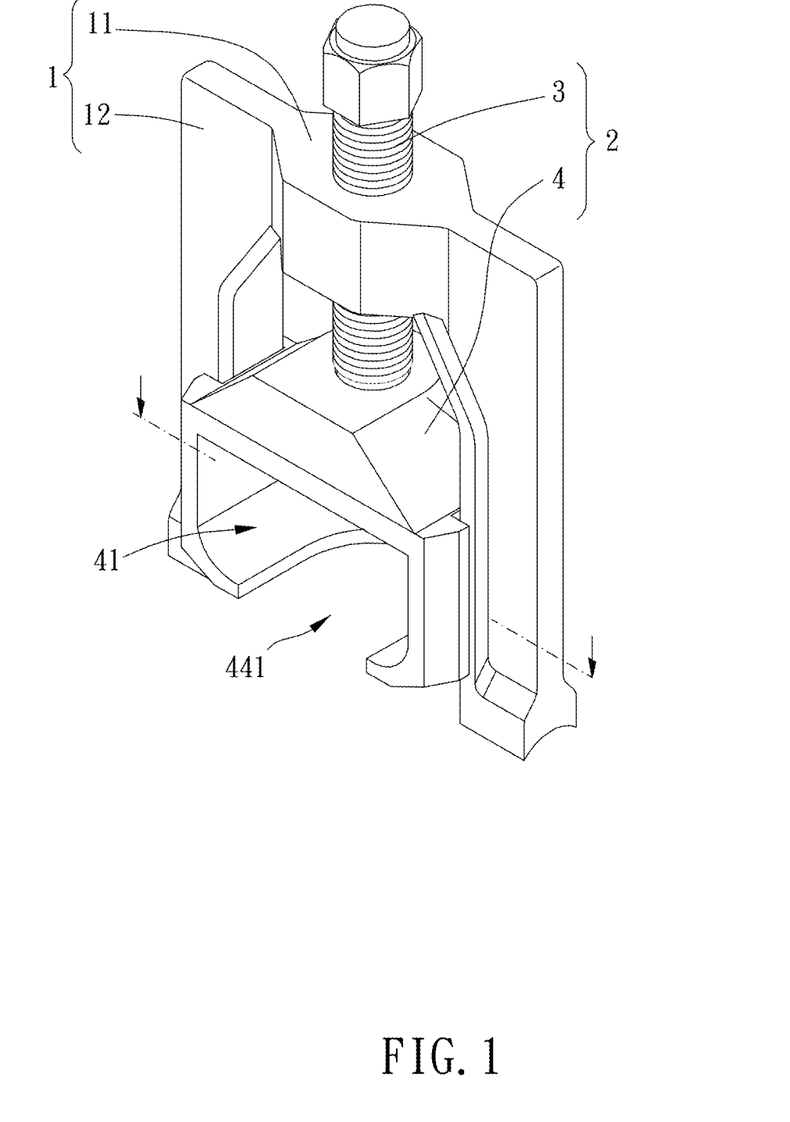
FIG. 1 is a stereogram of an embodiment of the present invention.
Figures 2, 3:
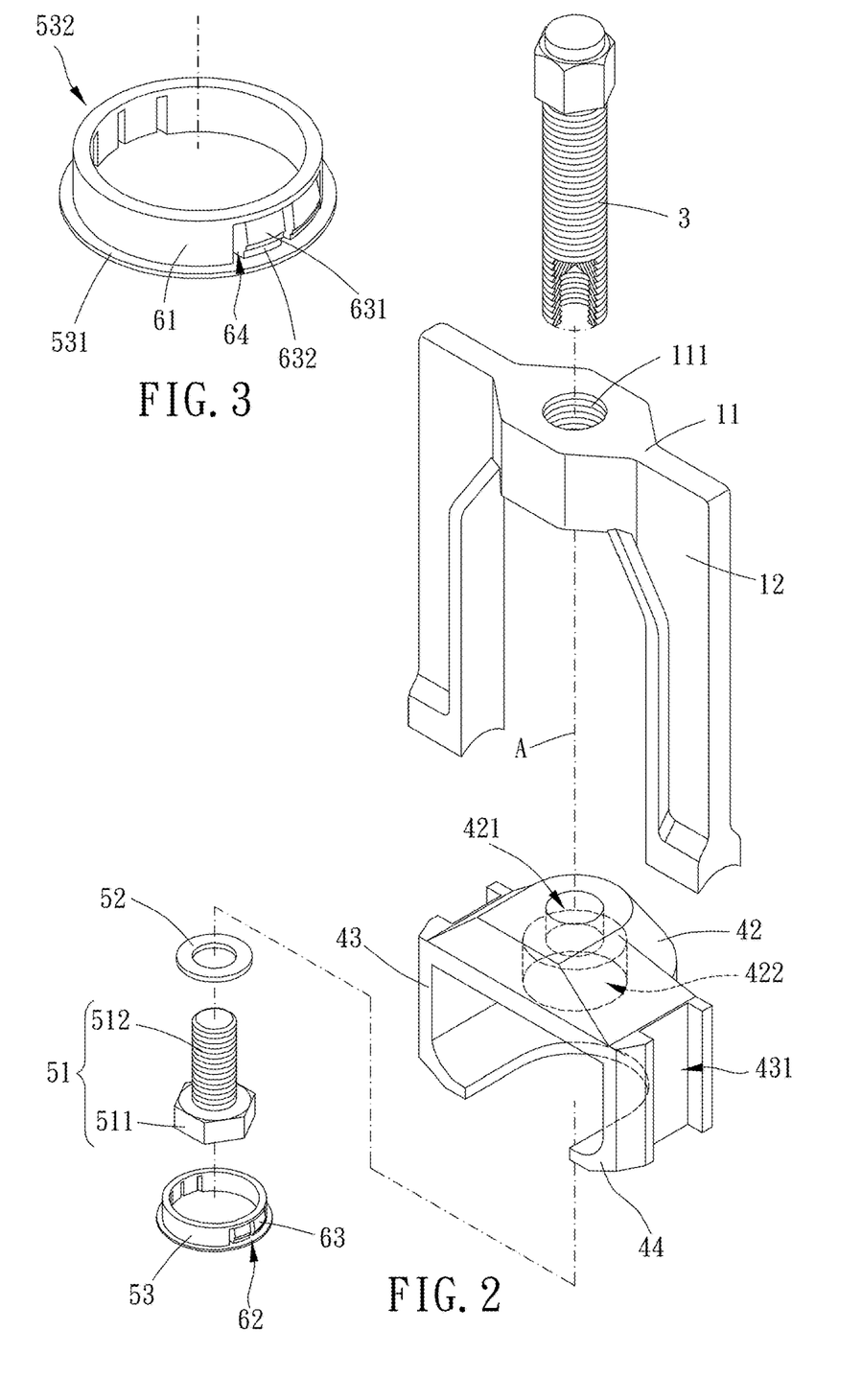
FIG. 2 is a breakdown view of FIG. 1.
FIG. 3 is an enlarged view of a cover member.
Figure 4:
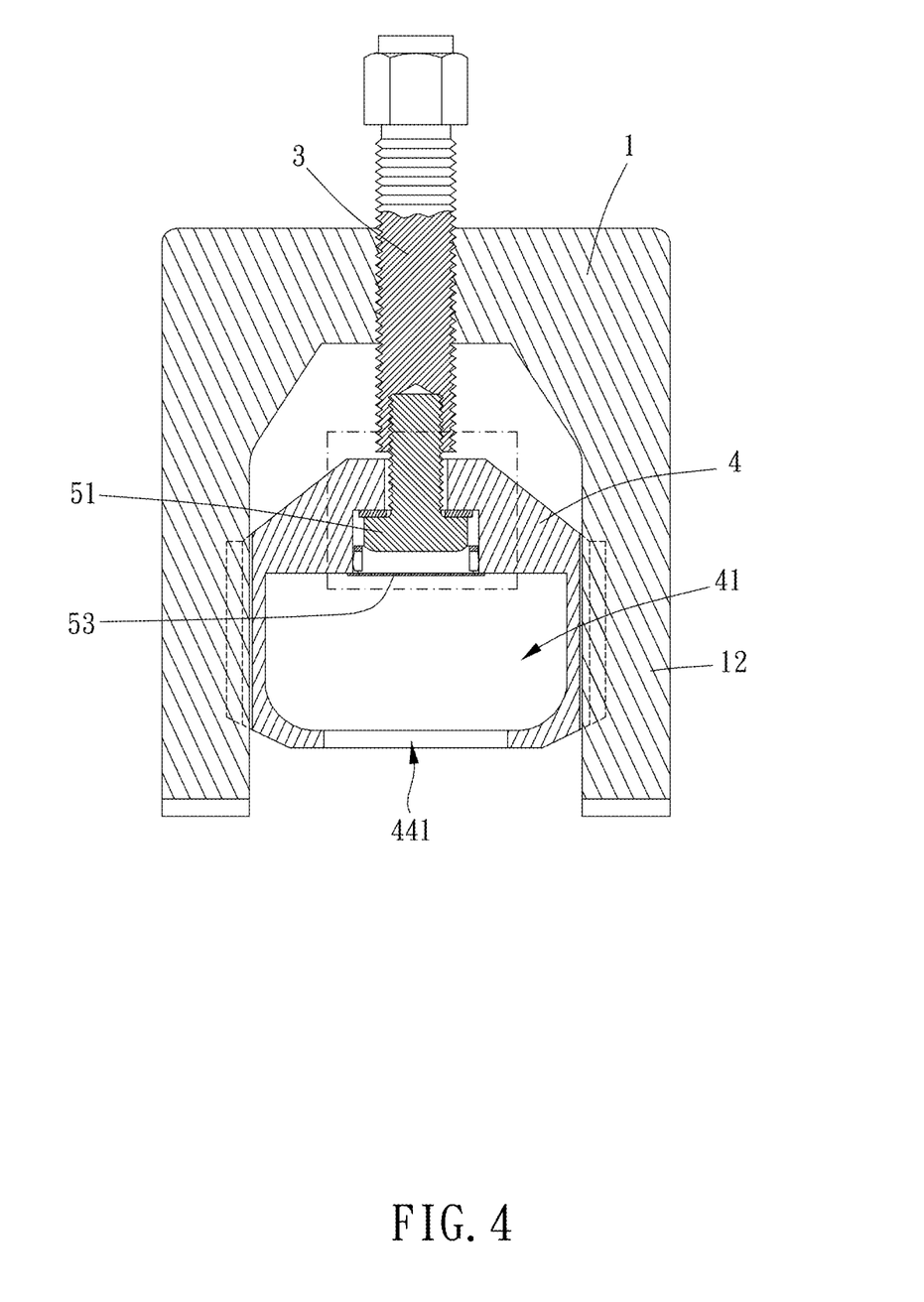
FIG. 4 is a cross-sectional side view of FIG. 1.
Figure 5:
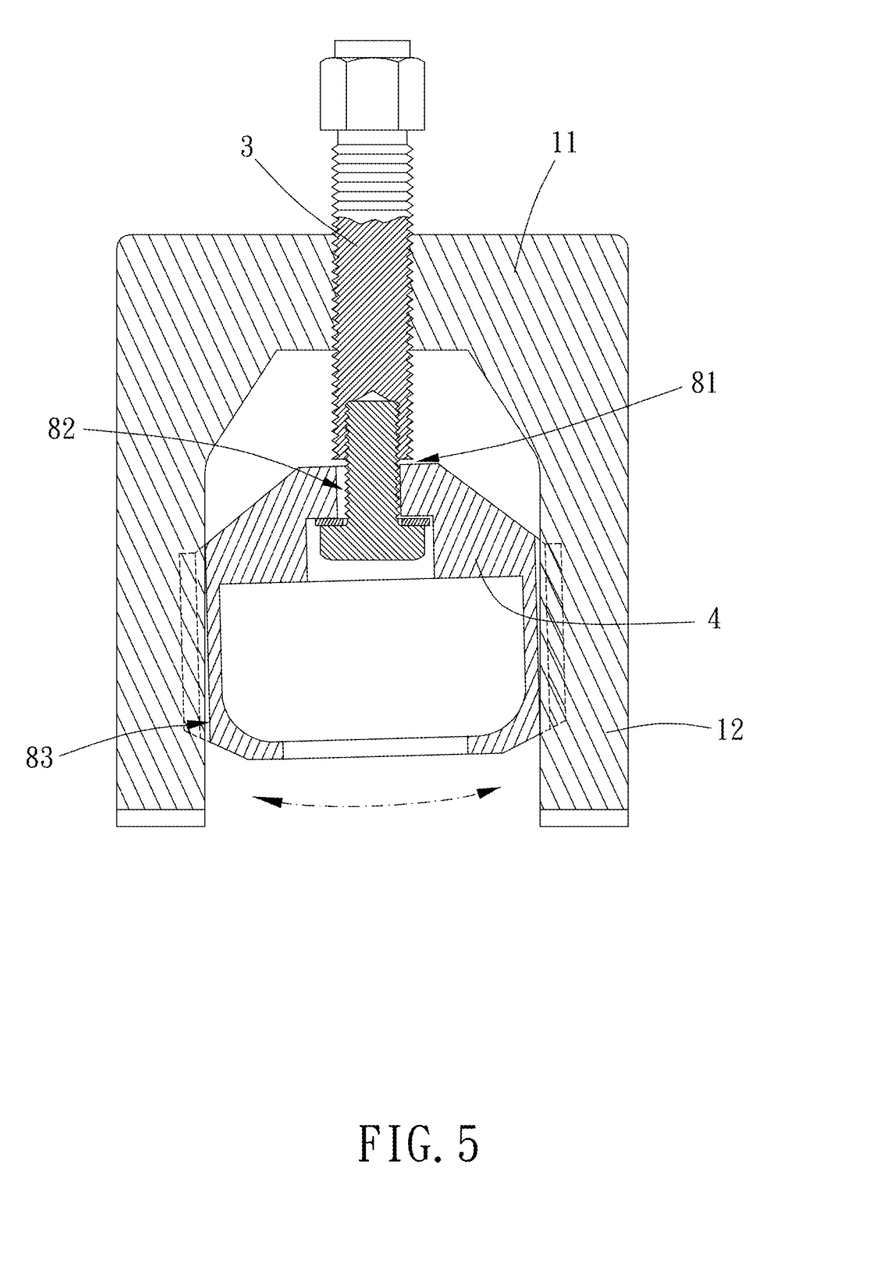
FIG. 5 is a drawing showing a cup member swinging relative to a driving rod of the embodiment of the present invention.
Figure 6:
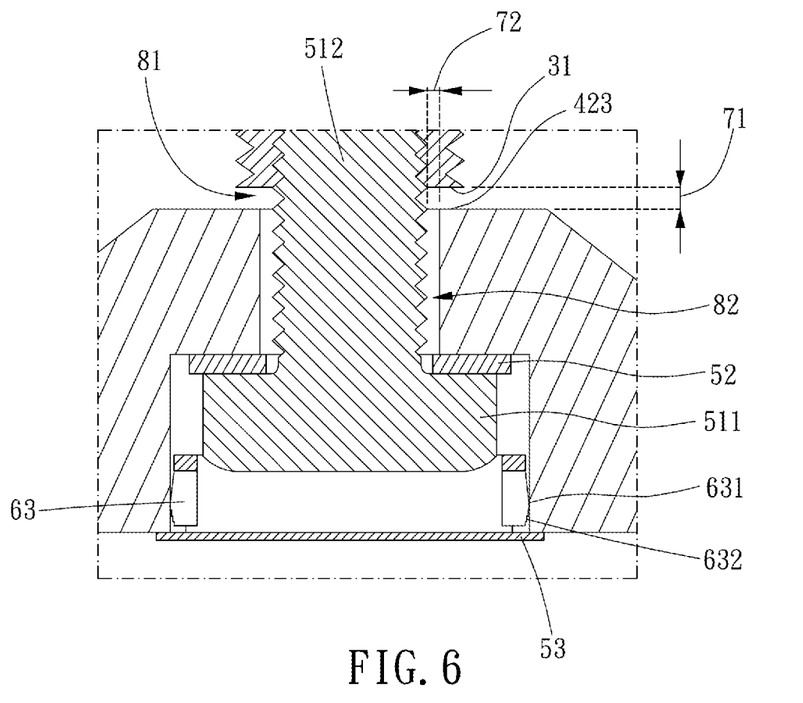
FIG. 6 is a partially enlarged view of FIG. 4.
Figure 7:
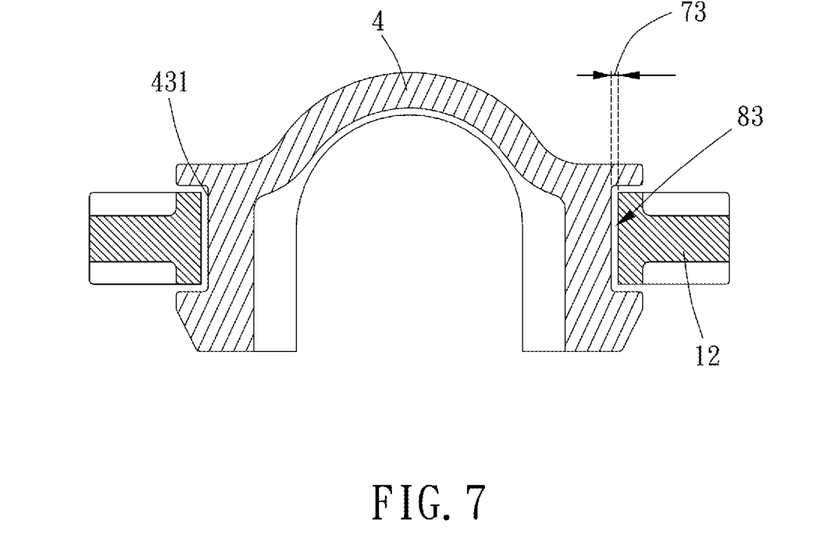
FIG. 7 is a cross-sectional top view of FIG. 1.
Figure 8:
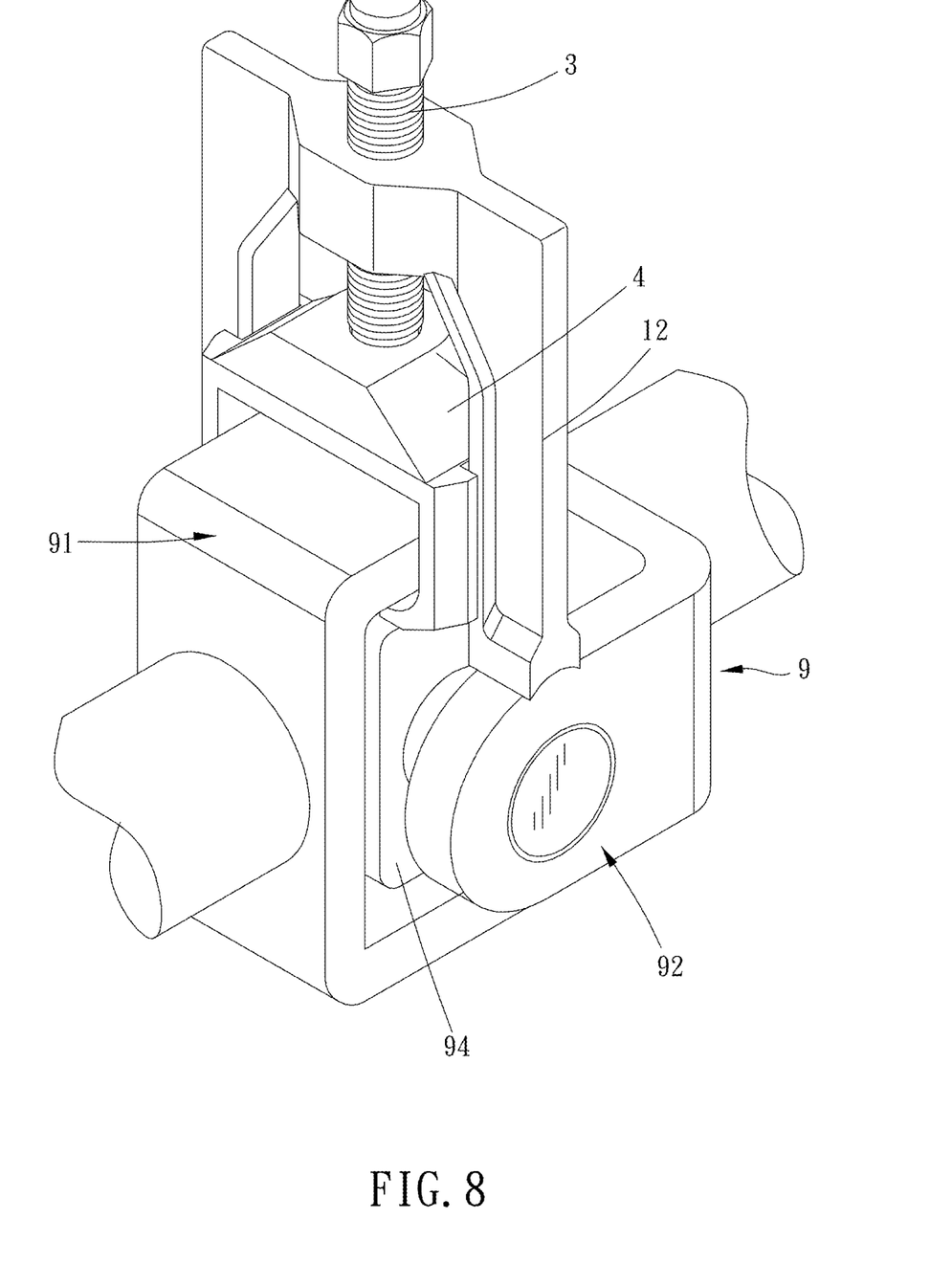
FIG. 8 is a stereogram showing the embodiment of the present invention in use.
Figure 9:
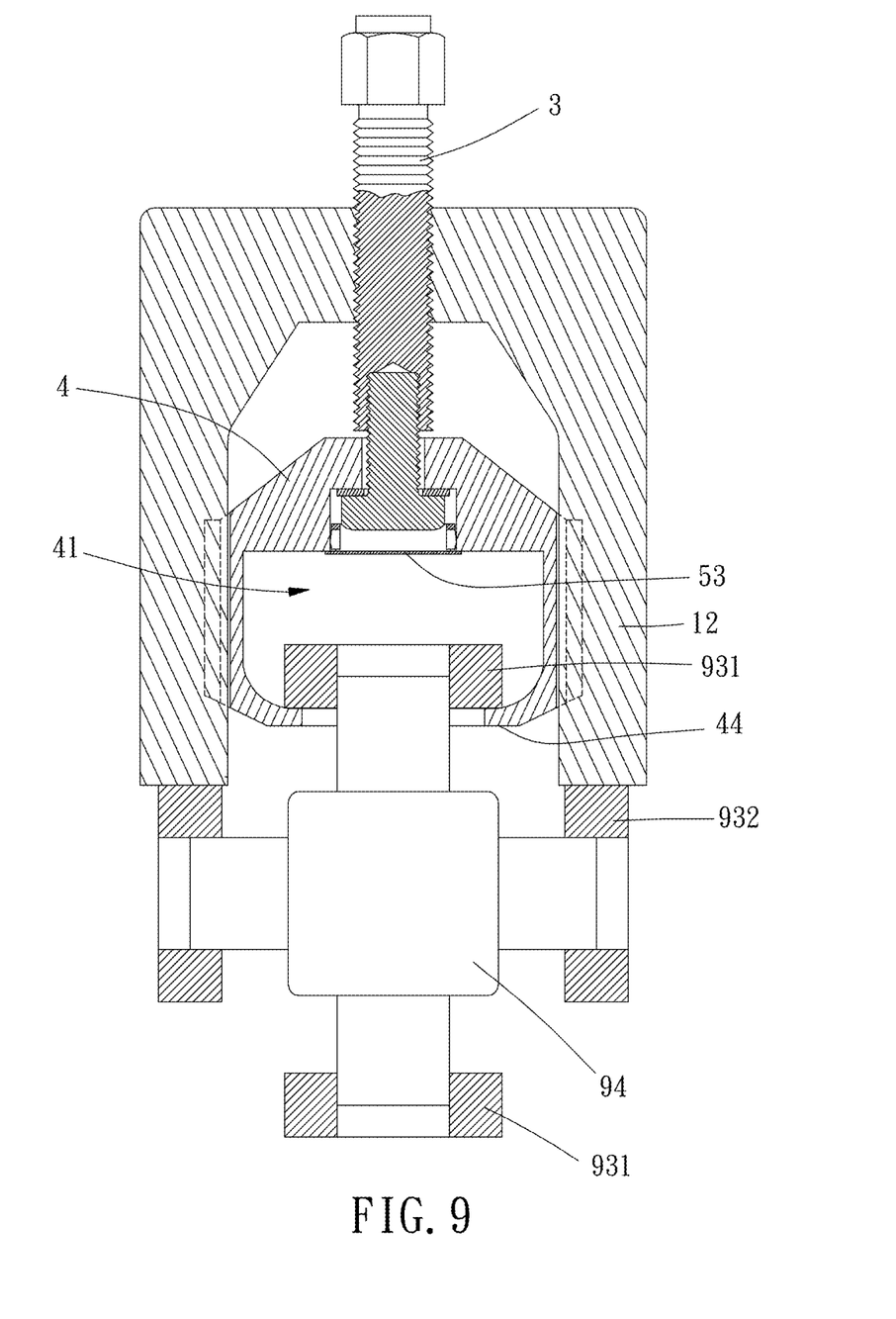
FIGS. 9 to 11 are drawings showing operation of the embodiment of the present invention in movement.
Figure 10:
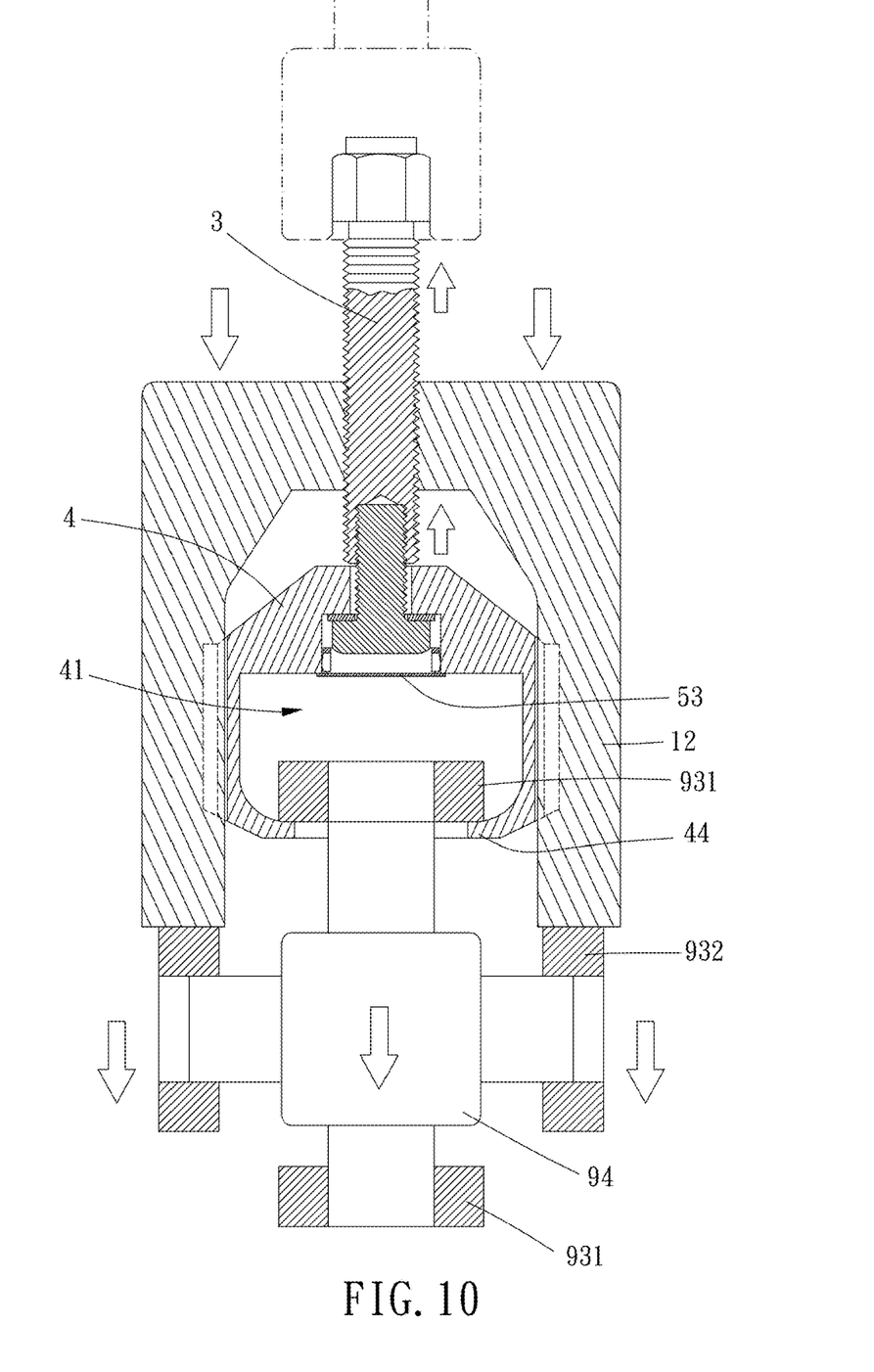
Figure 11:
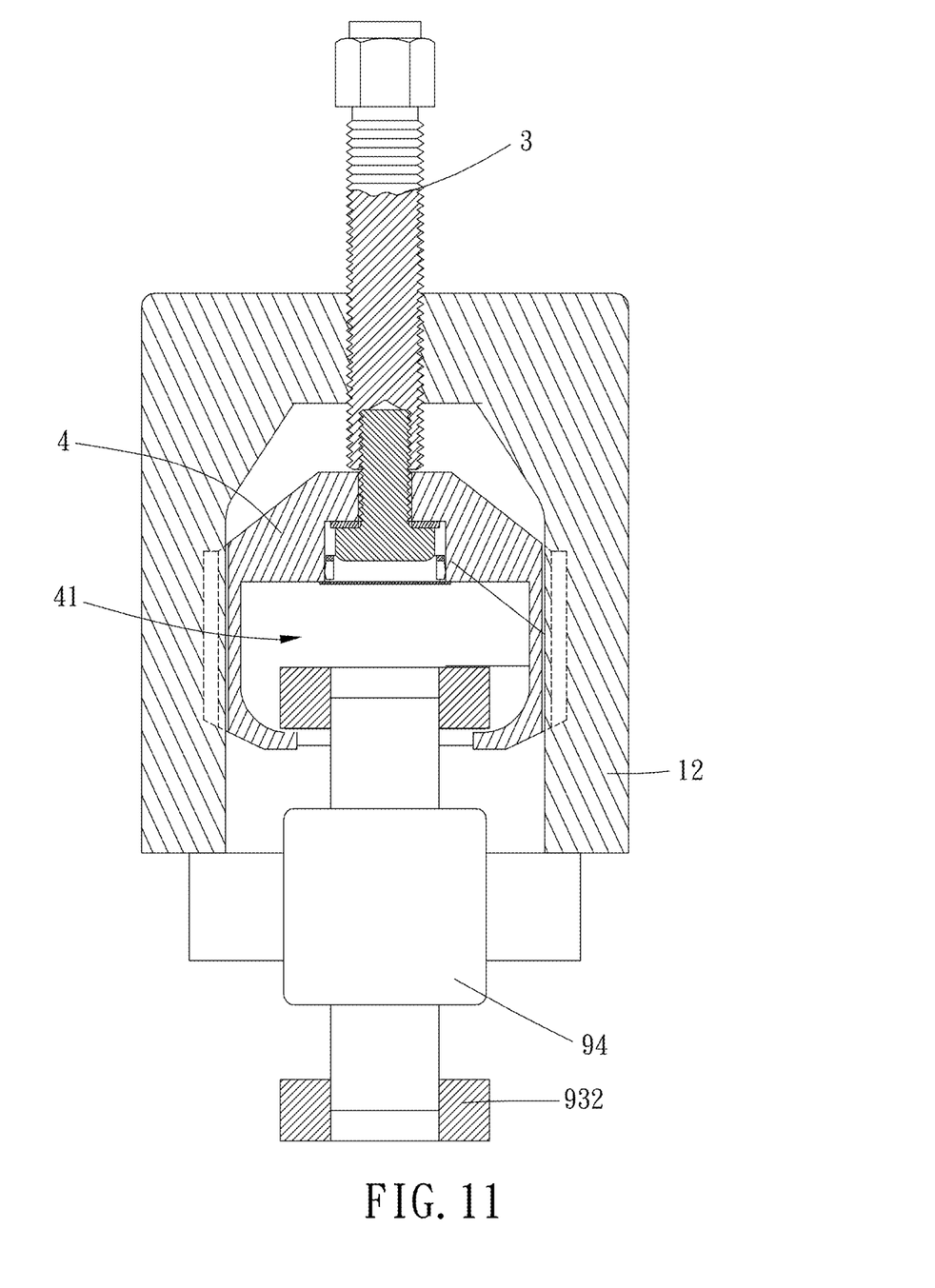

Please refer to FIGS. 1 to 11 for a preferred embodiment. A joint dismounting tool can be used to dismount a joint 9 (for example, a universal joint), the joint 9 includes a first jaw 91, a second jaw 92 and a bearing 94, the bearing 94 is detachably connected to and between the first jaw 91 and the second jaw 92, and the joint dismounting tool includes a frame body 1 and a pulling assembly 2.

The frame body 1 includes a base portion 11 and two arm portions 12, the base portion 11 has an assembly hole 111 along an axis A thereof, and the two arm portions 12 are spacingly connected to the base portion 11 and respectively extending axially. As viewed in a direction perpendicular to the axis A, the frame body 1 is upside-down U-shaped.

The pulling assembly 2 includes a driving rod 3 and a cup member 4, the driving rod 3 is movably disposed through the assembly hole 111, in this embodiment, the assembly hole 111 is a threaded hole, the driving rod 3 is movably screwed within the assembly hole 111, and an end of each of the two arm portions 12 remote from the base portion 11 is arc-shaped for abutting against the first jaw 91, the second jaw 92 or the bearing 94. The cup member 4 is disposed between the two arm portions 12, and the cup member 4 is connected to the driving rod 3 and relative to the axis A. Therefore, when the driving rod 3 rotates to drive the cup member 4 to move along the axis A, the cup member 4 can swing to an appropriate angle to slide relative to the two arm portions 12, and it can be ensure that during the process of the cup member 4 and the two arm portions 12 sliding relative to each other, the cup member 4 and the two arm portions 12 will not block each other or stuck.

More specifically, the cup member 4 includes a cup top 42, a cup body 43 and a cup bottom 44, the cup top 42 is connected to the driving rod 3, the cup top 42 and the cup bottom 44 are connected to the cup body 43 on two opposite sides, the cup bottom 44 has a recess 441, the cup top 42, the cup body 43 and the cup bottom 44 define an interior space 41 which is communicable with outside, and the interior space 41 communicates with the recess 441. It is to be noted that the cup top 42 and the driving rod 3 have a first distance 71 therebetween on an extension direction of the axis A to form a first allowance space 81, and the first allowance space 81 provides an axial space for the cup member 4 to swing. The first distance 71 is between 0.5 mm and 20 mm.

In actual use, the interior space 41 is for receiving a first supporting board 931 of the first jaw 91, the recess 441 is for a part of the bearing 94 to pass therethrough, and the two arm portions 12 abut against a second supporting board 932 of the second jaw 92. When rotating the driving rod 3, the cup bottom props up the first supporting board 931 of the first jaw 91, the two arm portions 12 slide downward relative to the cup member 4 to bias the second jaw 92 to sink, a part of the bearing 94 is detached from the first supporting board 931 of the first jaw 91 along the axis A, and the bearing 94 is detached from the first jaw 91. Then, the user can place the second supporting board 932 of the second jaw 92 into the interior space 41, the two arm portions abut against the bearing 94, when rotating the driving rod 3, the cup bottom 44 props up the second supporting board 932 of the second jaw 92, the two arm portions 12 slide downward relative to the cup member 4 to bias the bearing 94 to sink, a part of the bearing 94 is detached from the second supporting board 932 of the second jaw 92 along the axis A.

The pulling assembly 2 further includes a connecting member 51, the connecting member 51 includes a head portion 511 and a body portion 512, the cup top 42 has a through hole 421 along the axis A, the body portion 512 is disposed from the interior space 41 and through the through hole 421 to be connected to the driving rod 3, preferably, the connecting member 51 is detachably threaded with the driving rod 3 for assembling or replacing components easily, and the head portion 511 interferes with the cup top 42 on the extension direction of the axis A Specifically, a radial dimension of the head portion 511 is greater than a radial dimension of the body portion 512, a hole dimension of the through hole 421 is smaller than a rod dimension of the driving rod 3, and the hole dimension of the through hole 421 is greater than the radial dimension of the body portion 512 to form a second allowance space 82 therebetween. More specifically, a difference between a radius of the through hole 421 and a radius of the body portion 512 is a second distance 72, the second allowance space 82 provides a radial space for the cup member 4 to shift and swing, and a ratio of the second distance 72 to the first distance 71 is between 0.5 and 2. The head portion 511 is blocked in the cup top 42, the body portion 512 is radially movable within the through hole 421 and radially abuttable against the cup top 42, the driving rod 3 is located entirely outside the cup member 4, the driving rod 3 includes a distal end face 31 axially opposite to and facing an top face 423 of the cup top 42, the body portion 512 is inserted in the distal end face 31 and screwed to the driving rod 3, and the distal end face 31 of the driving rod 3 and the top face 423 of the cup top 42 have the first distance 71 therebetween. The hole dimension of the through hole 421 is smaller than a radial dimension of the distal end face 31 of the driving rod 3.

In this embodiment, the cup member 4 further includes two slideways 431, the two slideways 431 are disposed on the cup body 43 and extend in a direction parallel to the axis A, and the two arm portions 12 are respectively inserted in the two slideways 431 to ensure moving directions of the two arm portions 12. On a direction perpendicular to the axis A, a distance between the arm portion 12 and the axis A is greater than a distance between a bottom wall of the slideway 431 and the axis A, and the arm portion 12 and the bottom wall of the slideway 431 have a third allowance space 83 therebetween. The arm portion 12 and the bottom wall of the slideway 431 have a third distance 73 therebetween, the third allowance space 83 and the second allowance space 82 provide radial spaces for the cup member 4, and a ratio of the third distance 73 to the second distance 72 is between 0.4 and 1. When the first allowance space 81, the second allowance space 82 and the third allowance space 83 all exist to provide enough space to the cup member 4 on the axial direction and the radial direction, the cup member 4 can swing slightly while sliding to meet the environment requirement to ensure the smoothness of sliding.

Preferably, the pulling assembly 2 further includes a pad 52, and the pad 52 is sandwiched between the cup top 42 and the head portion 511.

More preferably, the cup top 42 further has a receiving groove 422, on the extension direction of the axis A, the receiving groove 422 is communicably disposed between the through hole 421 and the interior space 41, and the head portion 511 is wholly buried within the receiving groove 422. Therefore, when the cup member 4 is assembled to the joint 9, the joint 9 can be prevented from colliding with the head portion 511; in other words, the connecting member 51 can be ensured to have a complete structure, and the connecting member 51 and the driving rod 3 can be ensured to connected to each other stably.

Even more preferably, the pulling assembly 2 further includes a cover member 53, and the cover member 53 covers on the receiving groove 422 to cover the head portion 511 to effectively block foreign objects from entering the receiving groove 422, so that the connecting member 51 can be disposed in a preferable space.

In this embodiment, the cover member 53 is detachably disposed on the cup top 42, specifically, the cover member 53 includes a block portion 531 and an annular flange 532, the annular flange 532 is laterally connected to the block portion 531, the block portion 531 covers an opening of the receiving groove 422 on the extension direction of the axis A, and the annular flange 532 is configured to be embedded into the receiving groove 422 to laterally abuts against a wall portion of the receiving groove 422. More specifically, the annular flange 532 includes a main body 61 and at least one abutting mechanism 62, the abutting mechanism 62 includes an abutting member 63 and an open slot 64, the abutting member 63 is connected to the main body 61, the open slot 64 is disposed between the abutting member 63 and the block portion 531, and the abutting member 63 is elastically connected to the main body 61; wherein on a direction perpendicular to the axis A, a biasing portion 631 of the abutting member 63 protrudes beyond the main body 61 to laterally abut against the wall portion of the receiving groove 422.

It is to be noted that the cover member 53 is made of plastic to have preferably flexibility, so the cover member 53 can be embedded into the receiving groove 422, and the abutting member 63 is flexible. In addition, the abutting member 63 further includes a stepped structure 632 which is tapered, and the stepped structure 632 is connected to the biasing portion 631 and near the block portion 531. During operation, the stepped structure 632 can effectively control and adjust a position of the biasing portion 631, and the biasing portion 631 can be located in the middle of the abutting member 63 on the axis A to provide preferable structure strength and flexible lateral abutting force.

Given the above, the joint dismounting tool has a simple structure, so the user can quickly dismount the bearing from the jaw to observe and test and further to design multiple allowance spaces to allow the cup member to swing relative to the driving rod, so the cup member can smoothly slide relative to the two arm portions along the axis without being stuck.

While we have shown and described various embodiments in accordance with the present invention, it should be clear to those skilled in the art that further embodiments may be made without departing from the scope of the present invention.

What is claimed is:

1. A joint dismounting tool, including:
   a frame body, including a base portion and two arm portions, the base portion having an assembly hole along an axis thereof, the two arm portions being spacingly connected to the base portion and respectively extending axially;
   a pulling assembly, including a driving rod and a cup member, the driving rod being movably disposed through the assembly hole, the cup member being disposed between the two arm portions, connected to the driving rod and swingable relative to the axis, the cup member including a cup top, a cup body and a cup bottom, the cup top being connected to the driving rod, the cup top and the cup bottom being connected to the cup body on two opposite sides, the cup bottom having a recess, the cup top, the cup body and the cup bottom defining an interior space which is communicable with outside, the interior space communicating with the recess;
   wherein the pulling assembly further includes a connecting member, the connecting member includes a head portion and a body portion, the cup top has a through hole along the axis, the body portion extends from the interior space and through the through hole to be connected to the driving rod, the head portion is blocked in the cup top, the body portion is radially movable within the through hole and radially abuttable against the cup top, the driving rod is located entirely outside the cup member, the driving rod includes a distal end face axially opposite to and facing an top face of the cup top, the body portion is inserted in the distal end face and screwed to the driving rod, and the distal end face of the driving rod and the top face of the cup top have a first distance therebetween on an extension direction of the axis to form a first allowance space;
   wherein a radial dimension of the head portion is greater than a radial dimension of the body portion, a hole dimension of the through hole is smaller than a radial dimension of the distal end face of the driving rod, and the radial dimension of the through hole is greater than the radial dimension of the body portion to form a second allowance space therebetween.

2. The joint dismounting tool of claim 1, wherein the first distance is between 0.5 mm and 20 mm.

3. The joint dismounting tool of claim 1, wherein a difference between a radius of the through hole and a radius of the body portion is a second distance, and a ratio of the second distance to the first distance is between 0.5 and 2.

4. The joint dismounting tool of claim 1, wherein the cup top further has a receiving groove, on the extension direction of the axis, the receiving groove is communicably disposed between the through hole and the interior space, and the head portion is wholly buried within the receiving groove.

5. The joint dismounting tool of claim 4, wherein the pulling assembly further includes a cover member, and the cover member covers on the receiving groove to cover the head portion.

6. The joint dismounting tool of claim 5, wherein the cover member is detachably disposed on the cup top.

7. The joint dismounting tool of claim 6, wherein the cover member includes a block portion and an annular flange, the annular flange is laterally connected to the block portion, the block portion covers an opening of the receiving groove on the extension direction of the axis, and the annular flange is configured to be embedded into the receiving groove to laterally abuts against a wall portion of the receiving groove.

8. The joint dismounting tool of claim 7, wherein the annular flange includes a main body and at least one abutting mechanism, the abutting mechanism includes an abutting member and an open slot, the abutting member is connected to the main body, the open slot is disposed between the abutting member and the block portion, and the abutting member is elastically connected to the main body; wherein on a direction perpendicular to the axis, a biasing portion of the abutting member protrudes beyond the main body to laterally abut against the wall portion of the receiving groove.

9. The joint dismounting tool of claim 8, wherein the abutting member further includes a stepped structure which is tapered, and the stepped structure is connected to the biasing portion and near the block portion.

10. The joint dismounting tool of claim 1, wherein the cup member further includes two slideways, the two slideways are disposed on the cup body and extend in a direction parallel to the axis, the two arm portions are respectively inserted in the two slideways, on a direction perpendicular to the axis, a distance between the arm portion and the axis is greater than a distance between a bottom wall of the slideway and the axis, and the arm portion and the bottom wall of the slideway have a third allowance space therebetween.

11. The joint dismounting tool of claim 10, wherein the arm portion and the bottom wall of the slideway have a third distance therebetween, and a ratio of the third distance to the second distance is between 0.4 and 1.

12. The joint dismounting tool of claim 9, wherein the first distance is between 0.5 mm and 20 mm; a difference between a radius of the through hole and a radius of the body portion is a second distance, and a ratio of the second distance to the first distance is between 0.5 and 2; the cup member further includes two slideways, the two slideways are disposed on the cup body and extend in a direction parallel to the axis, the two arm portions are respectively inserted in the two slideways, on a direction perpendicular to the axis, a distance between the arm portion and the axis is greater than a distance between a bottom wall of the slideway and the axis, and the arm portion and the bottom wall of the slideway have a third allowance space therebetween; the arm portion and the bottom wall of the slideway have a third distance therebetween, and a ratio of the third distance to the second distance is between 0.4 and 1; as viewed in a direction perpendicular to the axis, the frame body is upside-down U-shaped; the assembly hole is a threaded hole, and the driving rod is movably screwed within the assembly hole; an end of each of the two arm portions remote from the base portion is arc-shaped; the pulling assembly further includes a pad, and the pad is sandwiched between the cup top and the head portion; the cover member is made of plastic.

* * * * *